Patented Sept. 5, 1933

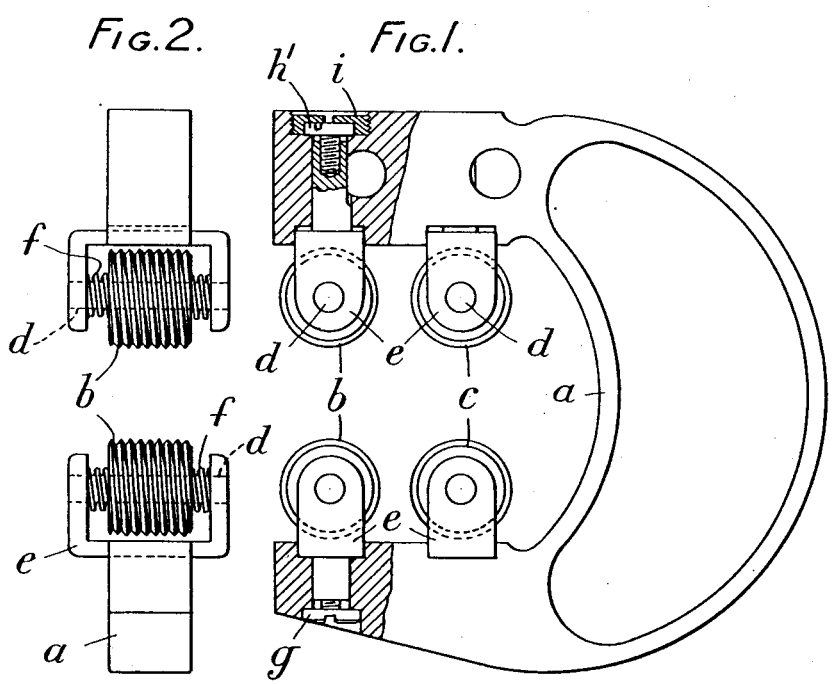

1,925,346

UNITED STATES PATENT OFFICE 1,925,346

SCREW-THREAD CALIPER GAUGE

Kenneth Edward Summers, Ponders End, England, assignor to The Newall Engineering Co. Ltd., Ponders End, Middlesex, England Application February 9, 1932, Serial No. 591,879, and in Great Britain February 11, 1931

7 Claims. (Cl. 33—199)

This invention relates to a screw-thread caliper gauge of the kind fitted with pairs of rollers between which the screws are passed in radial direction.

In known calipers of this kind the rollers are provided with annular ribs and grooves, and it is necessary, either to deform the ribs or to adapt the rollers to be pivotally deflected in their own planes in order to compensate for the obliquity of the screw-thread. Thus the construction of the caliper is complicated, and when the rollers are pivotally deflected only a spot contact is obtained without proper control over the checking of the screw-pitch.

The object of the present invention is to obviate these disadvantages, and the invention consists essentially in providing the rollers with proper screw-threads instead of annular grooves.

Fig. 1 of the accompanying drawing represents a side view of the improved gauge, partly in section, and Fig. 2 is a front view of the same.

The gauge comprises a frame $a$ wherein preferably two pairs of gauge rollers are mounted in the usual manner. One pair of gauge rollers $b$ is used for checking the full form of the screw-thread, and the other pair $c$ is used for ascertaining if the effective diameter of the work is above the permissible low limit.

According to the invention the rollers $b$ and $c$ are provided with proper screw-threads.

Mostly the rollers are of the same diameter as the screws to be gauged, but for small screws the rollers are preferably made twice or three times as large as the screws and provided correspondingly with double or treble threads to obtain the proper helical angle. For instance, for ¼ inch screws with 20 threads per inch, ½ inch gauge rollers may be employed having 10 double threads per inch. Alternatively ¾ inch gauge rollers could be used having 6⅔ treble threads per inch.

Since the size and obliquity of the roller threads are thus identical with the threads of the screw, and since the rollers are arranged axially in the same plane, a correct and complete check of the top diameter, effective diameter, crest and pitch will be obtained.

The gauge rollers are mounted on shafts $d$ fitted in forks $e$ and are free to rotate about their own axes. At least one of the rollers of each pair is free to move endwise to the extent of at least half the pitch of the work to be gauged. Thus the rollers can be readily positioned to fit the screw. The axial displacement of the roller may be opposed by a spring or springs $f$ which restore it to normal position when released.

One of the forks $e$ of each pair may be secured to the frame $a$ by means of a binding screw $g$ while the opposite fork is adjustable for setting the sizes. The adjustment may be effected by means of a screw the head $h'$ of which is recessed into the frame $a$ and retained in the recess by means of a screw collar $i$.

I claim:

1. A screw-thread caliper gauge comprising a frame, and pairs of opposing, freely rotatable, screw-threaded gauge rollers in said frame.

2. A screw-thread caliper gauge comprising a frame, and pairs of opposing, radially adjustable, freely rotatable, screw-threaded gauge rollers in said frame.

3. A screw-thread caliper gauge comprising a frame, and pairs of opposing, screw-threaded gauge rollers in said frame, said rollers being displaceable in the frame axially as well as rotatably.

4. The structure claimed in claim 3 in combination with springs controlling the axial positions of the rollers.

5. A screw-thread caliper gauge comprising a frame, and pairs of opposing, screw-threaded and freely rotatable gauge rollers in said frame, one roller of each pair being axially displaceable.

6. A screw-thread caliper gauge comprising a frame, and pairs of opposing, screw-threaded and freely rotatable gauge rollers in said frame, one roller of each pair being axially displaceable and spring-controlled.

7. A screw-thread caliper gauge comprising a frame, a pair of opposing, screw-threaded, freely rotatable gauge rollers in said frame, one of said rollers being axially displaceable and spring-controlled.

KENNETH EDWARD SUMMERS.